(12) United States Patent
Serafini

(10) Patent No.: US 12,504,117 B2
(45) Date of Patent: Dec. 23, 2025

(54) OBJECT HOLDING PLATFORM

(71) Applicant: Dale M. Serafini, West Seneca, NY (US)

(72) Inventor: Dale M. Serafini, West Seneca, NY (US)

( * ) Notice: Subject to any disclaimer, the term of this patent is extended or adjusted under 35 U.S.C. 154(b) by 82 days.

(21) Appl. No.: 18/421,168

(22) Filed: Jan. 24, 2024

(65) Prior Publication Data

US 2025/0237346 A1   Jul. 24, 2025

(51) Int. Cl.
*F16M 13/02* (2006.01)

(52) U.S. Cl.
CPC .................................. *F16M 13/02* (2013.01)

(58) Field of Classification Search
CPC ... E05D 3/02; E05D 2700/02; E05D 2700/04; A47G 25/0621; F16M 13/02
See application file for complete search history.

(56) References Cited

U.S. PATENT DOCUMENTS

| | | | | | |
|---|---|---|---|---|---|
| 1,751,691 | A | * | 3/1930 | Flath | F16M 11/2014 248/213.1 |
| 2,539,803 | A | * | 1/1951 | Westberg | A47G 25/0685 211/96 |
| 2,896,791 | A | * | 7/1959 | Raber | A47G 25/0621 248/213.1 |
| 3,044,630 | A | * | 7/1962 | Szabo | A47G 25/0621 248/213.1 |
| 3,825,127 | A | * | 7/1974 | Morrison | E05D 11/00 248/289.11 |
| 5,117,987 | A | * | 6/1992 | Lombardo | E05D 11/00 211/105.1 |
| 5,282,293 | A | * | 2/1994 | Pedoeem | E05D 3/12 16/371 |
| 6,050,427 | A | * | 4/2000 | Loveland | E05D 11/00 211/119.004 |
| 6,196,398 | B1 | * | 3/2001 | Lowe | D06F 57/12 211/96 |
| 7,908,711 | B2 | * | 3/2011 | Johnson | A47G 25/06 16/369 |
| 8,510,989 | B2 | | 8/2013 | Riley et al. | |
| 8,540,087 | B1 | * | 9/2013 | Skaer | A47G 25/0685 211/100 |
| 9,463,903 | B2 | * | 10/2016 | Garrett, Sr. | B65D 25/22 |
| 9,560,927 | B2 | * | 2/2017 | Krumpe | A47G 25/0607 |
| 9,599,276 | B2 | * | 3/2017 | Grziwok | F16M 11/2014 |

(Continued)

*Primary Examiner* — Eret C McNichols
(74) *Attorney, Agent, or Firm* — Law Office of Vincent LoTempio PLLC; Vincent G. LoTempio; Robert L. Cerasa

(57) ABSTRACT

Embodiments of the present disclosure provide an object holding platform. The object holding platform includes a base plate including a front surface and a rear surface. The object holding platform further includes a base plate housing attached to the front surface of the base plate through at least one screw. The base plate housing partially covers the front surface of the base plate. The base plate housing includes at least one coupling hole. The object holding platform further includes a hinge pin configured to extend at least partially through the at least one coupling hole of the base plate housing; and extend at least partially through a door hinge of a door. The object holding platform further includes one or more object holding members, each attached to the base plate. Each of the one or more object holding members is configured to hold an object.

9 Claims, 11 Drawing Sheets

(56) References Cited

U.S. PATENT DOCUMENTS

| | | | | |
|---|---|---|---|---|
| 9,752,327 B2* | 9/2017 | Poradzisz | ............ | E06B 3/5454 |
| 10,415,744 B1* | 9/2019 | Atalla | ............... | A47K 10/3809 |
| 10,465,843 B2* | 11/2019 | Mantella | ............... | F16B 45/008 |
| 10,946,233 B1* | 3/2021 | Neeley, Jr. | ......... | A63B 21/1663 |
| 11,013,325 B2* | 5/2021 | Meyer | .................. | A47F 5/0006 |
| 11,365,531 B2* | 6/2022 | Kuhlman | .............. | F16L 3/1218 |
| 11,821,137 B2* | 11/2023 | Shin | ........................ | D06F 73/02 |
| 12,163,362 B1* | 12/2024 | Barbaro | ................ | A47C 16/02 |
| 12,184,222 B2* | 12/2024 | Brandt | .................... | F24S 25/61 |
| 2007/0272637 A1* | 11/2007 | Rigas | ................ | A47G 25/0685 |
| | | | | 211/119.004 |
| 2010/0108834 A1* | 5/2010 | Rigas | ................ | A47G 25/0685 |
| | | | | 16/386 |
| 2019/0292822 A1 | 9/2019 | Kenerly et al. | | |
| 2025/0049242 A1* | 2/2025 | Glynos | ............. | A47G 25/0621 |
| 2025/0049243 A1* | 2/2025 | Glynos | ............. | A47G 25/0692 |
| 2025/0169634 A1* | 5/2025 | Glynos | ............. | A47G 25/0685 |

* cited by examiner

OBJECT HOLDING PLATFORM

TECHNICAL FIELD

The present disclosure relates generally to an object holding platform. More particularly, it relates to an object holding platform attachable to a door through hinge pins.

BACKGROUND

Objects such as musical instruments and clothing items are often placed in their protective cases and suitcases and/or closets, respectively. The protective cases and suitcases may be made of hard plastic. Further, the protective cases, suitcases, and closets take up a large area when not being used. The musical instruments may be placed out of their protective cases but in a safely supported position. One popular type of musical instrument is a guitar. The guitar may be dropped and may break when it is not placed in the protective case.

Another problem is that the guitar gets lost or kept untidily, very frequently. Another problem is that the guitar often lacks aesthetic appeal, shakes loose from its holders and/or requires permanent mounting to the guitar stand. Similar is the case with clothing items.

Therefore, there is a need for a platform for securing objects such as musical instruments and clothing items, which can address the above-mentioned shortcomings of conventional support.

OBJECTIVES OF THE INVENTION

It is an object of the invention to provide an object support device by which the object may be supported relative to a door.

Another object of the invention is to provide a stringed instrument support device by which the instrument may be supported relative to a door.

Another object of the invention is to provide a stringed instrument supporting device which may be adjusted to accommodate different sizes of stringed instruments.

Still another object of the invention is to provide a stringed instrument support device which may be readily collapsible for storage or transport.

Yet another object of the invention is to provide an instrument holding device which may be easily and rapidly adjusted to accept an instrument of a predetermined size without the necessity of fitting the device to the instrument.

SUMMARY

In one embodiment, an object holding platform is disclosed. The object holding platform includes a base plate including a front surface and a rear surface. Further, the object holding platform includes a base plate housing attached to the front surface of the base plate through at least one screw. The base plate housing partially covers the front surface of the base plate. The base plate housing includes at least one hole. Further, the object holding platform includes a hinge pin configured to extend through the at least one hole of the base plate housing and through a door hinge of a door. Further, the object holding platform includes one or more object holding members, each attached to the base plate. Each of the one or more object holding members is configured to hold an object.

In an additional embodiment, the base plate may include at least one hole configured to receive the hinge pin through the at least one hole of the base plate housing.

In an additional embodiment, the hinge pin may be made of a metal or an alloy.

In an additional embodiment, the object holding platform may include a pin cap configured to cover the hinge pin.

In an additional embodiment, the base plate housing may be made of a metal.

In an additional embodiment, each of the one or more object holding members may be selected from a group consisting of a two-pronged bracket, a peg, and a hook.

In an additional embodiment, each of the one or more object holding members may be removably attached to the base plate.

In an additional embodiment, the base plate may include one or more protruding male screws mounted on the front surface.

In an additional embodiment, each of the one or more object holding members may include an embedded female screw.

In an additional embodiment, the one or more object holding members may be attached to the base plate when each of the one or more male screws may be fastened into the embedded female screw.

It is to be understood that both the foregoing general description and the following detailed description are exemplary and explanatory only and are not restrictive of the invention, as claimed.

BRIEF DESCRIPTION OF THE DRAWINGS

The foregoing will be apparent from the following more particular description of the example embodiments, as illustrated in the accompanying drawings in which reference characters refer to the same parts throughout the different views. The drawings are not necessarily to scale, emphasis instead being placed upon illustrating the exemplary embodiments.

DETAILED DESCRIPTION

Figure 1:
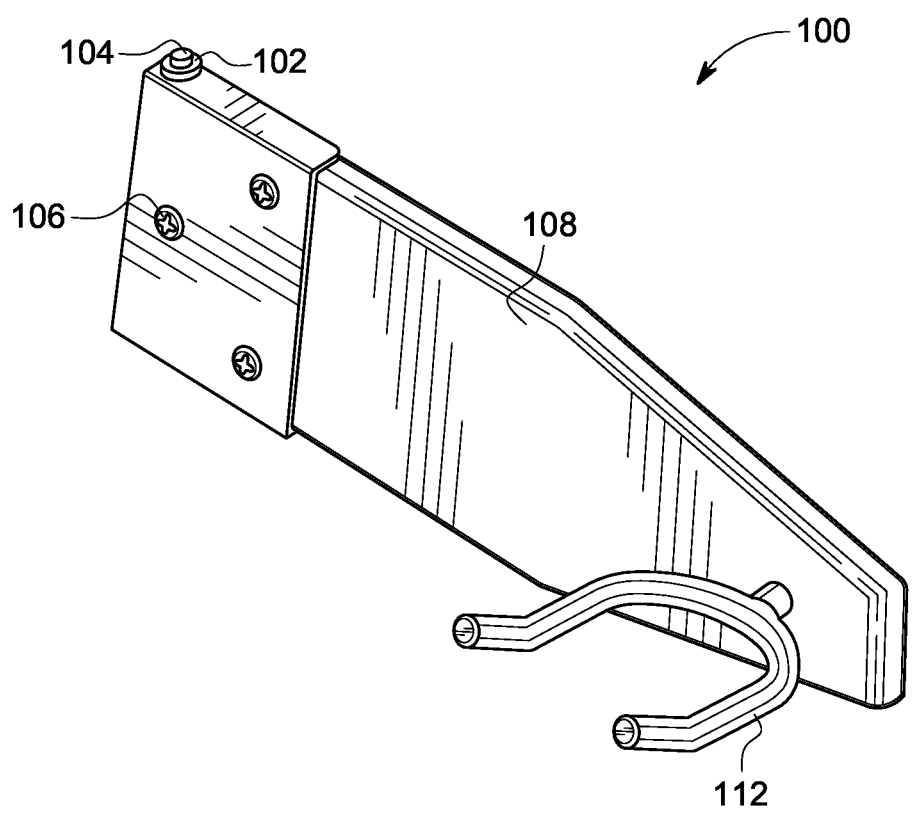
FIG. 1 illustrates a perspective view of an exemplary object holding platform, in accordance with some embodiments of the present invention.

Aspects of the present disclosure will be described more fully hereinafter with reference to the accompanying drawings. The apparatus and methods disclosed herein can, however, be realized in many different forms and should not be construed as being limited to the aspects set forth herein. Like numbers in the drawings refer to like elements throughout.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

The terminology used herein is for the purpose of describing particular aspects of the disclosure only and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an", and "the" are intended to include the plural forms as well, unless the context clearly indicates otherwise.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of the present disclosure will be described and exemplified more fully hereinafter with reference to the accompanying drawings. The solutions disclosed herein can, however, be realized in many different forms and should not be construed as being limited to the embodiments set forth herein.

FIG. 1 illustrates a perspective view of an exemplary object holding platform 100, in accordance with some embodiments of the present invention. The object holding platform 100 may be used to hold one or more objects such as, but not limited to, a musical instruments (for example, an acoustic guitar, an electric guitar, a semi-acoustic guitar, an ukulele, a bass guitar, etc.), clothing items (e.g., a coat, a shirt, a pant, a dress, a cap, etc.), utensils, photo frames, mirrors, or the like.

The object holding platform 100 may include a hinge pin 102, a pin cap 104, a base plate housing 106, a base plate 108, at least one screw 110, and one or more object holding members (such as a two-pronged bracket 112). The object holding platform 100 may be installable over a door. In an embodiment, the door may be any type of door that opens and closes by means of movement over a door hinge.

To install the object holding platform 100 on the door, the hinge pin 102 may extend at least partially through an interior of the base plate 108 of the object holding platform 100 and may extend at least partially through a door hinge of the door. The hinge pin 102 may be made of a suitable material, such as metal or alloy. The material of the hinge pin 102 may be selected based on strength and rigidity requirements of the hinge pin 102.

The hinge pin 102 may be covered using a pin cap 104. The pin cap 104 may prevent rusting and deterioration of the hinge pin 102 by external factors (such as moisture or atmospheric oxygen). The pin cap 104 may be made of plastic for providing appropriate insulation from atmosphere. More advantageously in some embodiments, the pin cap 104 may prevent any squeaking noise produced by a contact between the hinge pin 102 and an inner surface of the door hinge when the door is being opened or closed.

The base plate 108 may include a front surface, a rear surface, and a lateral surface (defined by the thickness of the base plate 108). A shape of the base plate 108 may be a simple shape (e.g., a triangular shape, an elliptical shape, a rectangular shape, etc.) or a complex shape (e.g., a polygonal shape). A size of the base plate 108 may be limited by a size of the door as well as a desired stability of the object holding platform 100 (i.e., too large of a base plate may not stably coupled to the door hinge). Similarly, the object holding platform 100 may also have a maximum load limit. The base plate 108 may be made of wood, a metal, an alloy, or a plastic material.

Further, each of the base plate 108 and the base plate housing 106 may include at least one hole. The base plate housing 106 may be attached to the front surface of the base plate 108 by fastening or drilling the at least one screw 110 through the at least one hole. The base plate housing 106 may include an inner side, an outer side, a top side, and a bottom side. It should be noted that an inner side of the base plate housing 106 may partially cover the front surface of the base plate 106. It should also be noted that the top side and the bottom side of the base plate housing 106 may partially cover the lateral surface of the base plate 108. The top side and the bottom side of the base plate housing 106 may be along a top side and a bottom side of the lateral surface of the base plate 108. The base plate housing 106 may be made of a metal, an alloy, or a plastic material.

Further, the base plate housing 106 may include at least one coupling hole. The at least one coupling hole may allow the hinge pin 102 to connect to the door. In particular, the hinge pin 102 may be configured to extend at least partially through the at least one coupling hole of the base plate housing 106 and extend at least partially through the door hinge of the door. The at least one coupling hole may be near a corner of the top side or a corner of the bottom side of the base plate housing 106, or both.

The hinge pin 102 may couple the object holding platform 100 to the door hinge by vertically extending (partially or completely) through the length of the base plate housing 106 and (partially or completely) through the length of the door hinge. In some embodiments, the coupling of the object holding platform 100 to the door hinge is reversible. In some embodiments, the object holding platform 100 can be moved pivotably to an extent allowed within constraints of the door. Alternatively, the pivoting movement of the object holding platform 100 is more restricted depending upon tightness of the coupling between the hinge pin 102 and the door hinge.

In some embodiments, the base plate 108 may also include at least one hole along the lateral surface configured to receive the hinge pin 102 through the at least one coupling hole of the base plate housing 108. In such embodiments, the hinge pin 102 may vertically extend (partially or completely) through each of the at least one coupling hole of the base plate housing, the at least one hole along the lateral surface, and the door hinge of the door.

The one or more object holding members may be attached to the base plate 108. The one or more object holding members may hold an object by hanging/suspending the object. By way of an example, the one or more object holding members may be, but may not be limited to, two-pronged brackets, pegs, and hooks. In the case of the object holding platform 100, the object holding member is the two-pronged bracket 112. The two-pronged bracket 112 may removably hold the object in place. The objects may remain in a suspended state from the two-pronged bracket 112 when held through the two-pronged bracket 112.

In some embodiments, each of the one or more object holding members may be removably attached to the base plate 108. In some embodiments, the base plate 108 may include one or more protruding male screws mounted on the front surface. Further, in such embodiments, each of the one or more object holding members may include an embedded female screw. Here, the one or more object holding members may be removably attached to the base plate 108 when each of the one or more male screws is fastened into the embedded female screw. Then, to remove the one or more object holding members, a user may unfasten the object holding member from the protruding male screws.

Advantageously, the object holding platform 100 may be installed on a door hinge without drilling any holes into the door or a wall. Also, the object holding platform 100 may make more space in a room available, as the objects may not take up space of floor or closets in a house.

Figure 2:
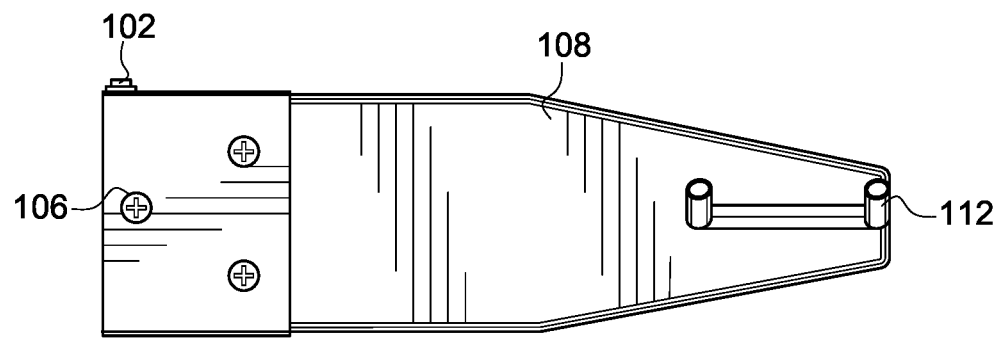
FIG. 2 illustrates a front view of a platform for mounting a musical instrument, in accordance with some embodiments of the present invention.
Figure 3:
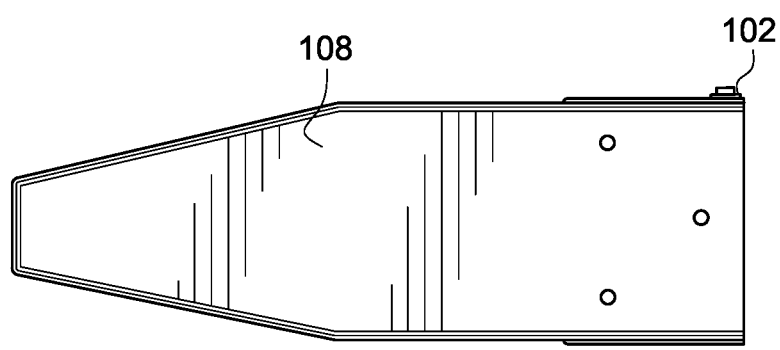
FIG. 3 illustrates a back view of a platform for mounting a musical instrument, in accordance with some embodiments of the present invention.
Figure 4:
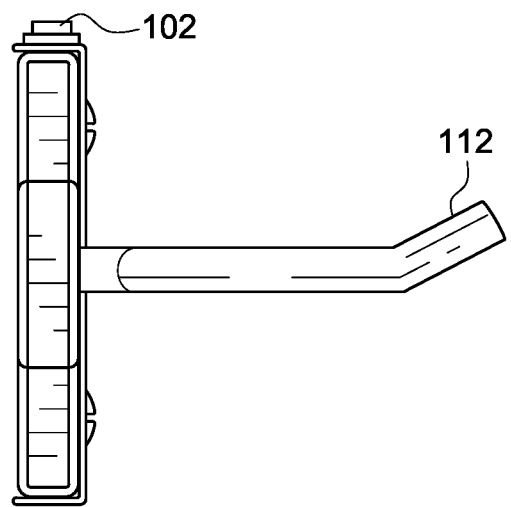
FIG. 4 illustrates a left-side view of a platform for mounting a musical instrument, in accordance with some embodiments of the present invention.
Figure 5:
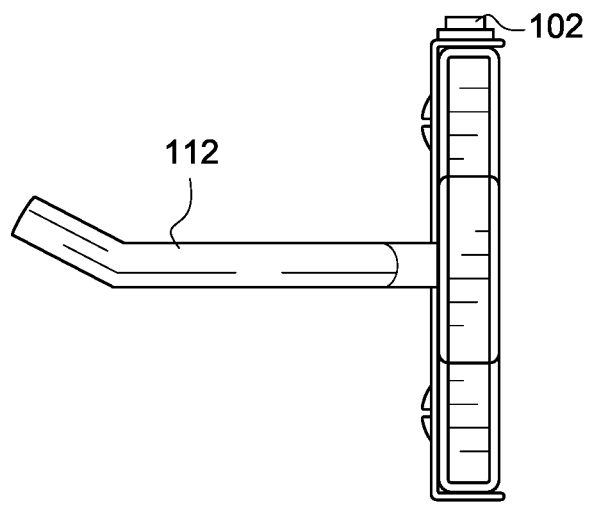
FIG. 5 illustrates a right-side view of a platform for mounting a musical instrument, in accordance with some embodiments of the present invention.
Figure 6:
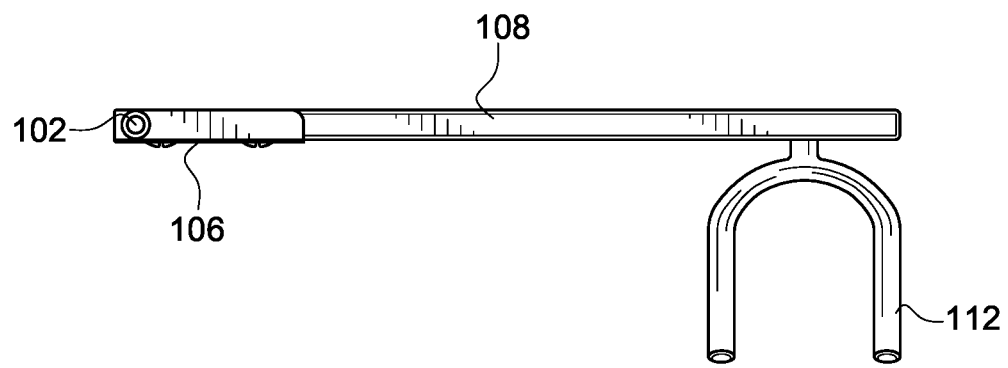
FIG. 6 illustrates a top view of a platform for mounting a musical instrument, in accordance with some embodiments of the present invention.
Figure 7:
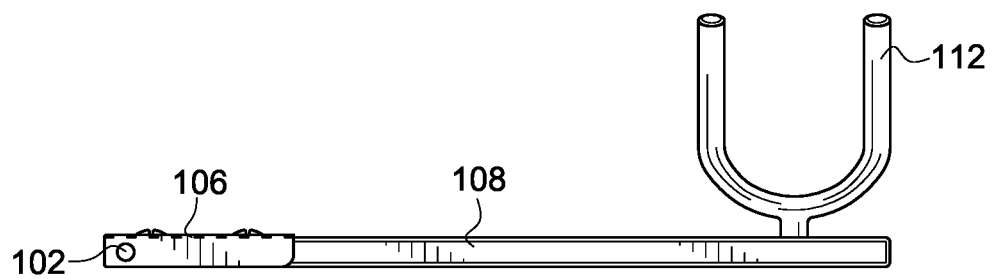
FIG. 7 illustrates a bottom view of a platform for mounting a musical instrument, in accordance with some embodiments of the present invention.

FIGS. 2-7 illustrate different perspective views of the object holding platform 100, in accordance with some embodiments of present invention. For example, FIG. 2 illustrates a front view of the object holding platform 100, FIG. 3 illustrates a back view of the object holding platform 100, FIG. 4 illustrates a left-side view of the object holding platform 100, FIG. 5 illustrates a right-side view of the object holding platform 100, FIG. 6 illustrates a top view of the object holding platform 100, and FIG. 7 illustrates a bottom view of the object holding platform 100, in accordance with some embodiments of present invention.

Figure 8:
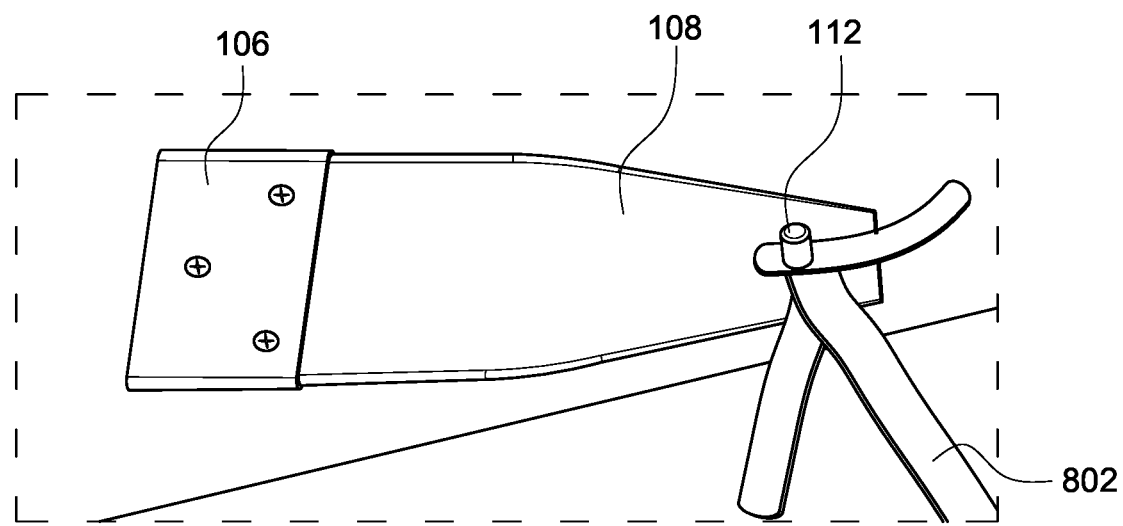
FIG. 8 illustrates a perspective view of the object holding platform with an object fastening attachment, in accordance with some embodiments of the present invention.

FIG. 8 illustrates a perspective view of the object holding platform 100 with an object fastening attachment 802, in accordance with some embodiments of the present invention. The object fastening attachment 802 may fasten the object being held by the one or more object holding members. By way of an example, the object fastening attachment 802 may be a velcro tape, a fastening belt, or the like. Once an object is placed on an object holding member (e.g., two-pronged bracket 112), there may be some unwanted movement in the object, for example when the door is opened or closed, especially when the object is large and heavy (e.g., a guitar). There may also be a risk of the object falling down. The object fastening attachment 802 may provide an additional layer of stability to the object in such situations. In some embodiments, the object holding platform may include more than one object fastening attachments, each performing a similar function as the object fastening attachment 802.

Figure 9:
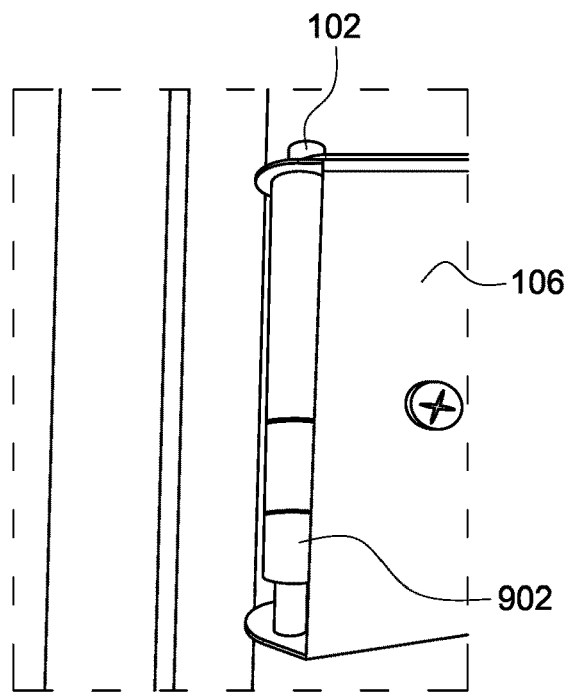
FIG. 9 illustrates a perspective view of the hinge pin coupling with a door hinge, in accordance with some embodiments of the present invention.
Figure 10:
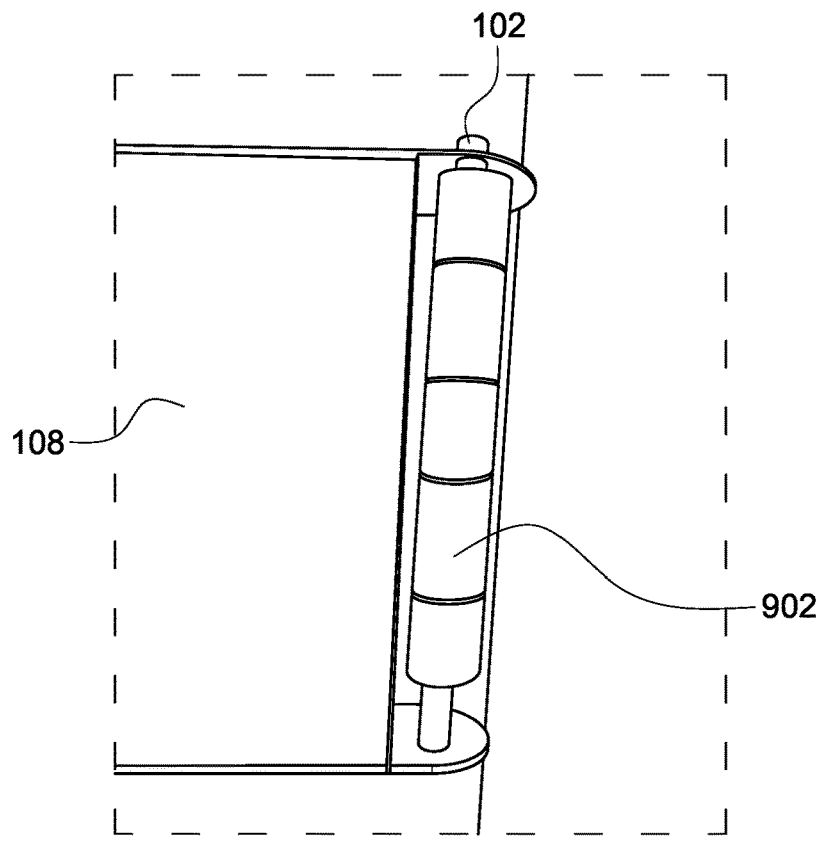
FIG. 10 illustrates another perspective view of the hinge pin coupling with a door hinge, in accordance with some embodiments of the present invention.

FIGS. 9 and 10 illustrate different perspective views of the hinge pin 102 coupling with a door hinge 902, in accordance with some embodiments of the present invention. For example, FIG. 9 illustrates a perspective view of the hinge pin 102 coupling with a door hinge 902, and FIG. 10 illustrates another perspective view of the hinge pin 102 coupling with the door hinge 902, in accordance with some embodiments of the present invention. The hinge pin 102 extends vertically through the at least one coupling hole on the top side of the base plate housing 106 throughout the length of the door hinge 902, thus coupling the base plate housing 106 with the door. Further, the hinge pins extends out of the door hinge 902 and into the at least one coupling hole on the bottom side of the base plate housing 106. Thus, the object holding platform 100 may be installed on the door without having to drill holes into the door or a wall. In some embodiments, the object holding platform 100 may be pivotably movable along the axis of the door hinge 902. Alternatively, movement of the object holding platform 100 may be restricted depending upon the tightness of the coupling between the hinge pin 102 and the door hinge 902. In some embodiments, the object holding platform 100 may include two hinge pins-one extending vertically from top of the door hinge 902 and another extending vertically from bottom of the door hinge 902.

Figure 11:
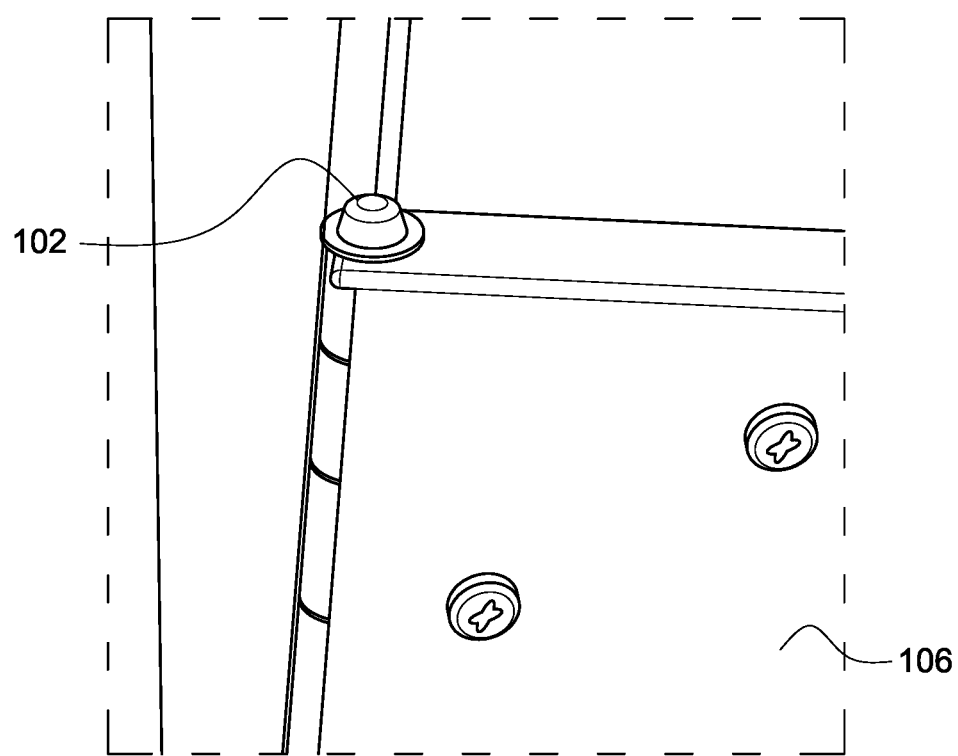
FIG. 11 illustrates a perspective view of a top section of the hinge pin coupling with a door hinge, in accordance with some embodiments of the present invention.

FIG. 11 illustrates a perspective view of a top section of the hinge pin 102 coupling with the door hinge 902, in accordance with some embodiments of the present invention. In embodiments where there are two hinge pins-one extending vertically from top of the door hinge 902 and another extending vertically from bottom of the door hinge 902, the top section may include a complete length of a single hinge pin.

Figure 12:
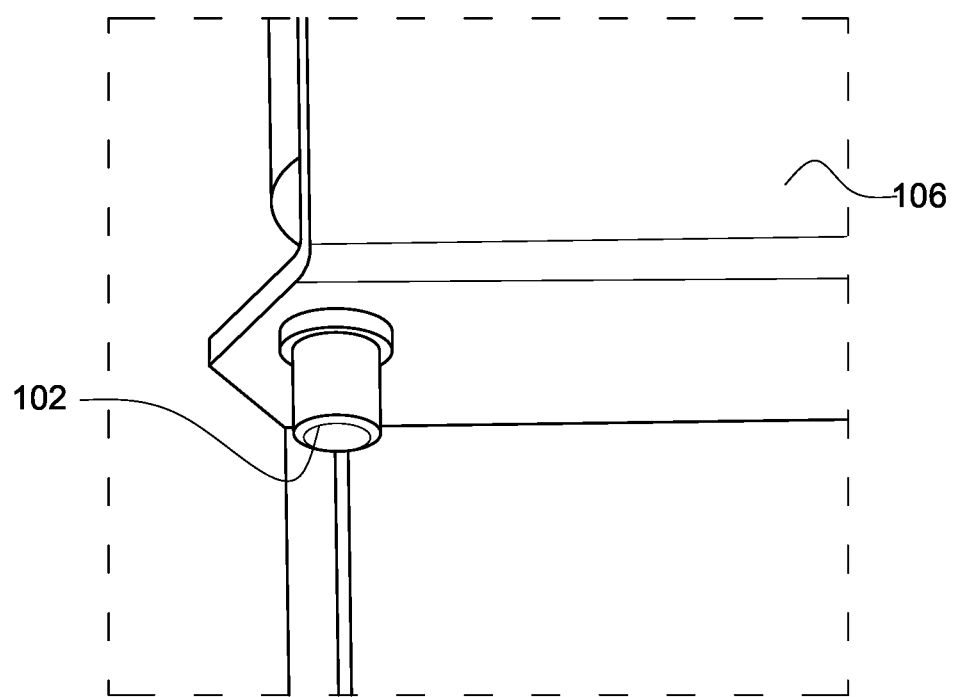
FIG. 12 illustrates a perspective view of a bottom section of the hinge pin coupling with a door hinge, in accordance with some embodiments of the present invention.

FIG. 12 illustrates a perspective view of a bottom section of the hinge pin 102 coupling with the door hinge 902, in accordance with some embodiments of the present invention. In embodiments where there are two hinge pins—one extending vertically from top of the door hinge 902 and another extending vertically from bottom of the door hinge 902, the bottom section may include a complete length of a single hinge pin.

Figure 13:
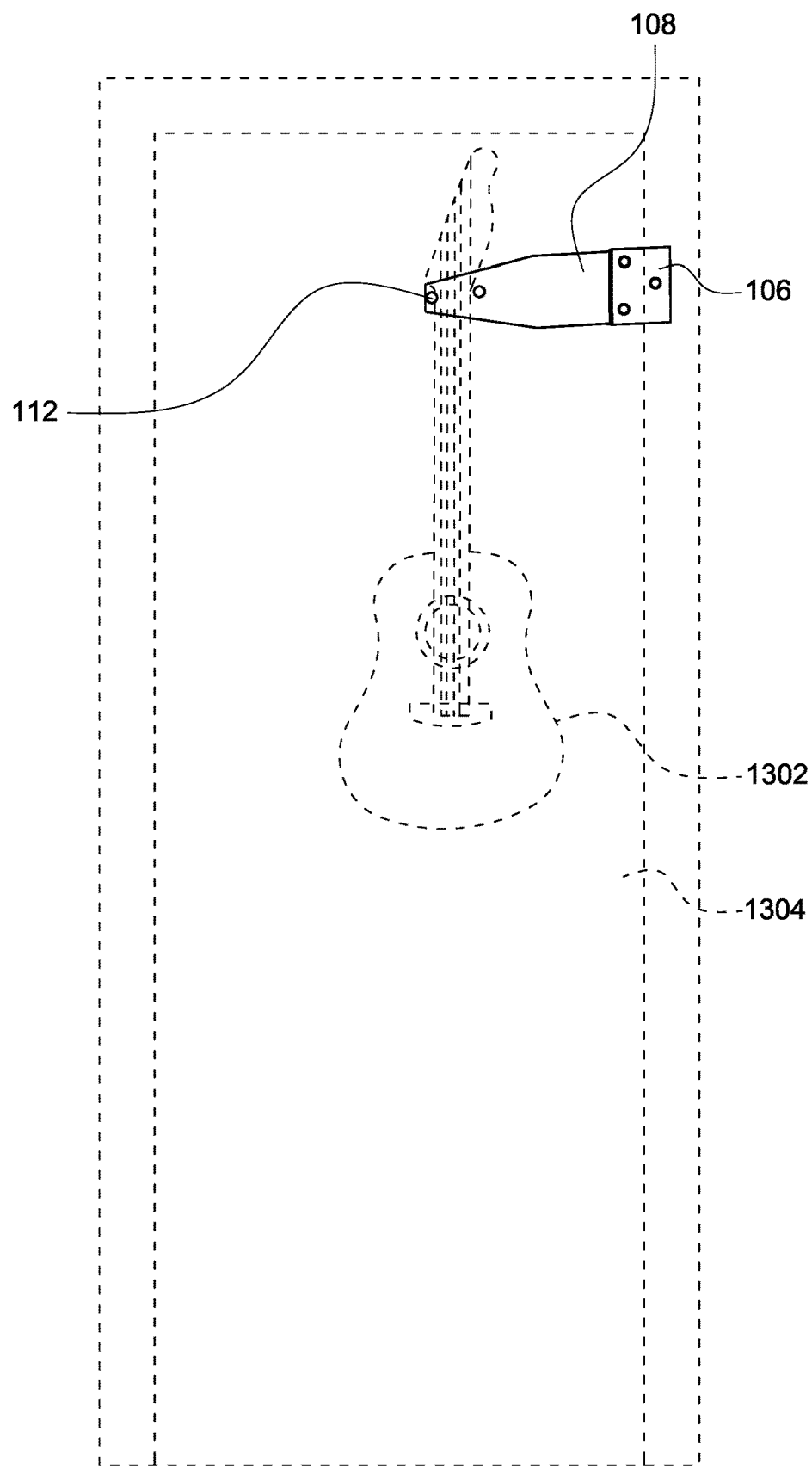
FIG. 13 illustrates a platform installed on a door for mounting a musical instrument, in accordance with some embodiments of the present invention.

FIG. 13 illustrates the object holding platform 100 installed on a door 1304 and holding an object 1302, in accordance with some embodiments of the present invention. As explained in detail in conjunction with FIG. 1, the object holding platform 100 may be installed over the door 1304 (through the coupling between the hinge pin 102 and the door hinge) without making any holes. The object 1302 (for example, a guitar) may be hung/suspended vertically through the two-pronged bracket 112 of the object holding platform 100. The object holding platform 100 may save space by keeping the object from occupying space on the floor.

Figure 14:
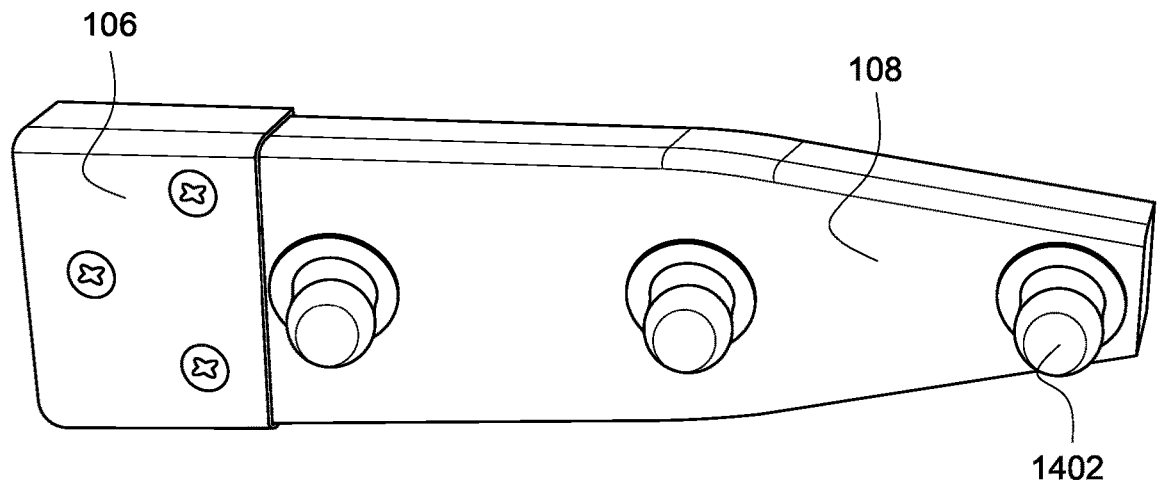
FIG. 14 illustrates a perspective view of another exemplary object holding platform, in accordance with some embodiments of the present invention.

FIG. 14 illustrates a perspective view of another exemplary object holding platform 100, in accordance with some embodiments of the present invention. Here, instead of the two-pronged bracket, a first set of pegs 1402 is attached to the base plate 108 as the one or more object holding members. Each of the first set of pegs 1402 may have a spherical top section and a short cylindrical bottom section. Further, each of the first set of pegs 1402 may be attached to the base plate 108 from the bottom section. Hence, an object may be hung/suspended from the cylindrical bottom section and may be protected from falling/slipping off by the spherical top section. It should be noted that some embodiments may include slight modifications to shapes and sizes of the first set of pegs 1402 without affecting the intended functionality of the top section and the bottom section.

Also, in some embodiments, the first set of pegs 1402 may be removably attached to the base plate 108. In some embodiments, the base plate 108 may include one or more protruding male screws mounted on the front surface. Further, in such embodiments, each of the first set of pegs 1402 may include an embedded female screw. Here, the first set of pegs 1402 may be removably attached to the base plate 108 when each of the one or more male screws is fastened into the embedded female screw. Then, to remove the first set of pegs 1402, a user may unfasten a peg from the protruding male screws.

Figure 15:
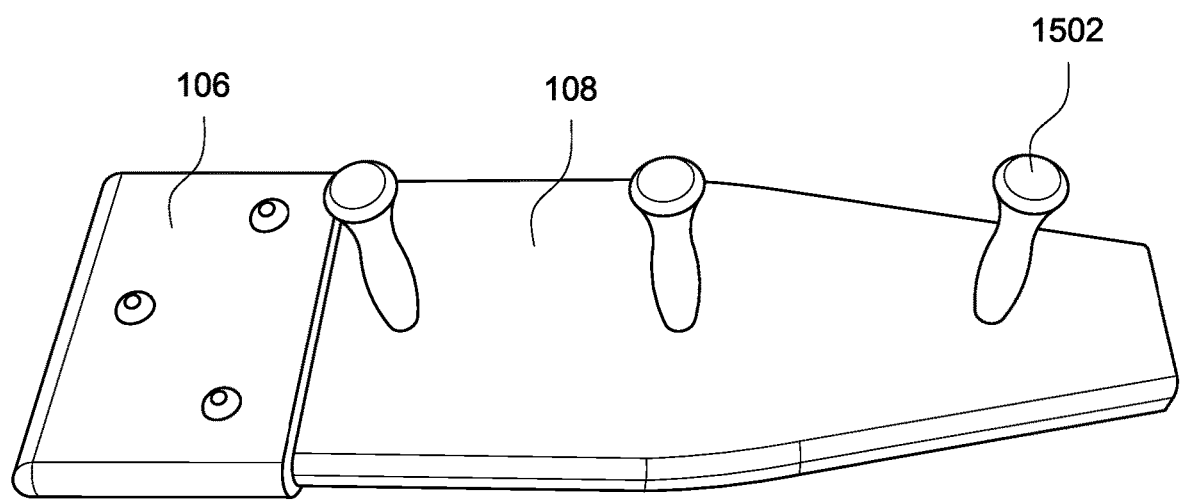
FIG. 15 illustrates a perspective view of another exemplary object holding platform, in accordance with some embodiments of the present invention.

FIG. 15 illustrates a perspective view of another exemplary object holding platform 100, in accordance with some embodiments of the present invention. Here, instead of the two-pronged bracket 112 or the first set of pegs 1402, a second set of pegs 1502 is attached to the base plate 108 as the one or more object holding members. Each of the second set of pegs 1502 may have a spherical top section and an elongated cylindrical bottom section. Further, each of the second set of pegs 1502 may be attached to the base plate 108 from the bottom section. Hence, an object may be hung/suspended from the cylindrical bottom section and may be protected from falling/slipping off by the spherical top section. It should be noted that some embodiments may include slight modifications to shapes and sizes of the first set of pegs 1502 without affecting the intended functionality of the top section and the bottom section.

Also, in some embodiments, the second set of pegs 1502 may be removably attached to the base plate 108. In some embodiments, the base plate 108 may include one or more protruding male screws mounted on the front surface. Further, in such embodiments, each of the second set of pegs 1502 may include an embedded female screw. Here, the second set of pegs 1502 may be removably attached to the base plate 108 when each of the one or more male screws is fastened into the embedded female screw. Then, to remove the second set of pegs 1502, a user may unfasten a peg from the protruding male screws.

Figure 16:
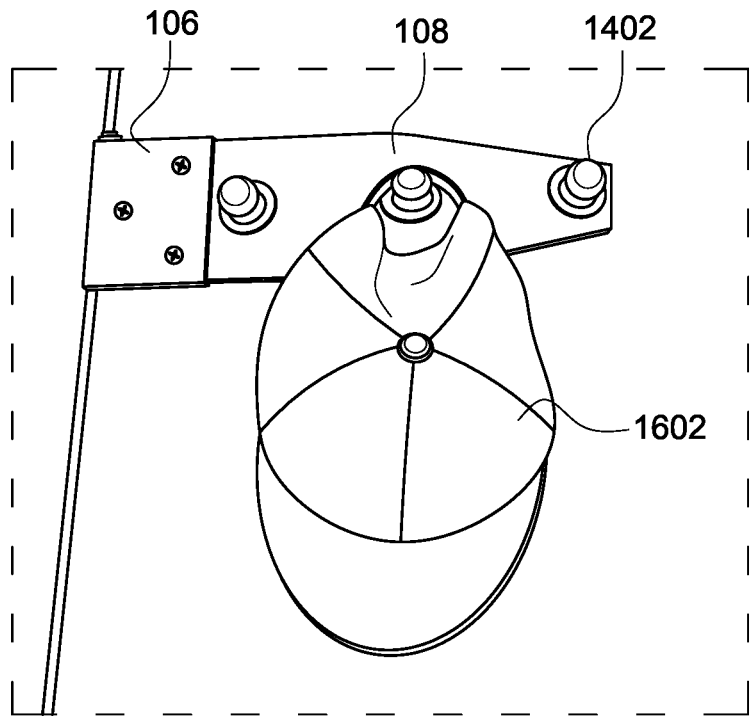
FIG. 16 illustrates a front view of an exemplary object holding platform holding an object, in accordance with some embodiments of the present invention.

FIG. 16 illustrates a front view of an exemplary object holding platform 100 holding an object 1602, in accordance with some embodiments of the present invention. As explained in detail in conjunction with FIG. 1, the object holding platform 100 may be installed over the door (through the coupling between the hinge pin 102 and the door hinge) without making any holes. The object 1602 (for example, a cap) may be hung/suspended vertically through the first set of pegs 1402 of the object holding platform 100. The object holding platform 100 may save space by keeping the object from occupying space on the floor.

Figure 17:
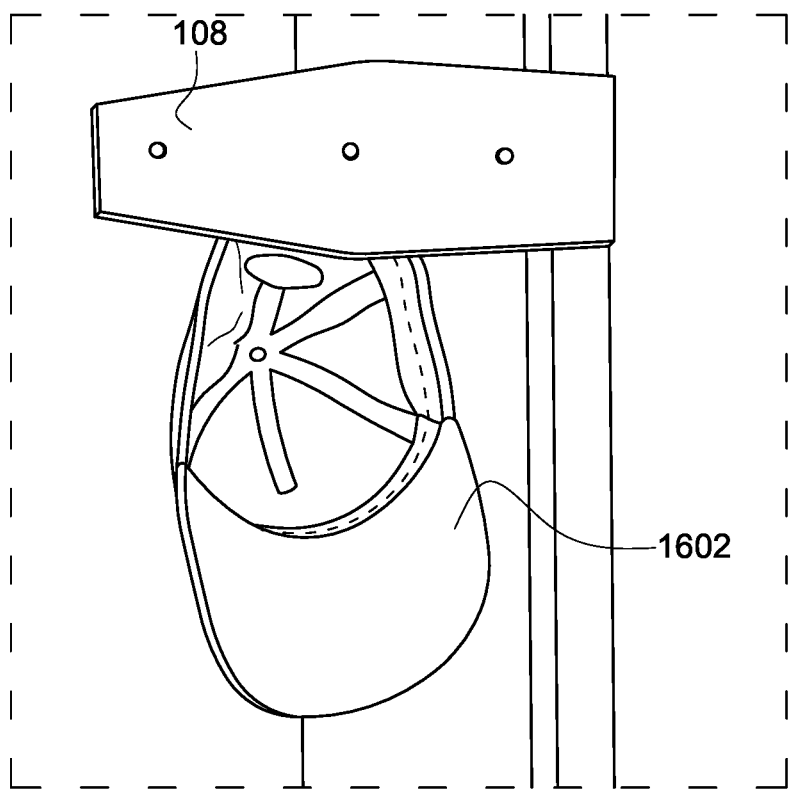
FIG. 17 illustrates a rear view of an exemplary object holding platform holding an object, in accordance with some embodiments of the present invention.
Figure 18:
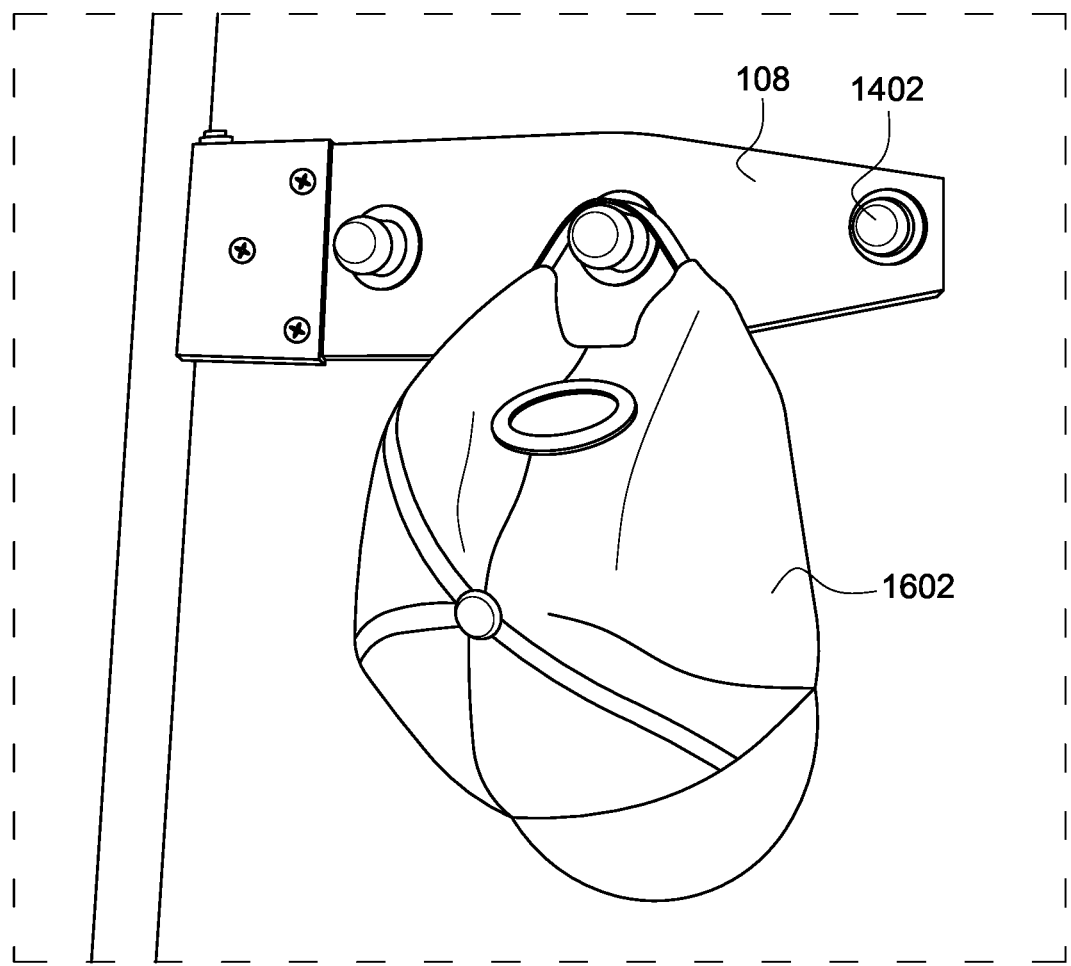
FIG. 18 illustrates a perspective view of an exemplary object holding platform holding an object, in accordance with some embodiments of the present invention.

FIGS. 17 and 18 illustrate different perspective views of the object holding platform 100 holding the object 1602, in accordance with some embodiments of present invention. For example, FIG. 17 illustrates a rear view of an exemplary object holding platform 100 holding the object 1602, and FIG. 18 illustrates a perspective view of an exemplary object holding platform 100 holding the object 1602, in accordance with some embodiments of the present invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

As a person skilled in the art will recognize from the previous detailed description and the figures and claims, modifications and changes can be made to the embodiments of the invention without departing from the spirit and scope of this invention.

What is claimed is:

1. An object holding platform, comprising:
   a base plate comprising a front surface and a rear surface
   a base plate housing attached to the front surface of the base plate through at least one screw, wherein the base plate housing partially covers the front surface of the base plate, and wherein the base plate housing comprises at least one coupling hole, wherein the base plate comprises at least one hole configured to receive the hinge pin through the at least one coupling hole of the base plate housing;
   a hinge pin configured to:
      extend at least partially through the at least one coupling hole of the base plate housing; and
      extend at least partially through a door hinge of a door; and
   one or more object holding members, each attached to the base plate, wherein each of the one or more object holding members is configured to hold an object.

2. The object holding platform of claim 1, wherein the hinge pin is made of a metal or an alloy.

3. The object holding platform of claim 1, comprising a pin cap configured to cover the hinge pin.

4. The object holding platform of claim 1, wherein the base plate housing is made of a metal or an alloy.

5. The object holding platform of claim 1, wherein each of the one or more object holding members is selected from a group consisting of a two-pronged bracket, a peg, and a hook.

6. The object holding platform of claim 1, wherein each of the one or more object holding members is removably attached to the base plate.

7. The object holding platform of claim 1, wherein the base plate comprises one or more protruding male screws mounted on the front surface.

8. The object holding platform of claim 7, wherein each of the one or more object holding members comprises an embedded female screw.

9. The object holding platform of claim 8, wherein the one or more object holding members are attached to the base plate when each of the one or more male screws is fastened into the embedded female screw.

\* \* \* \* \*